(12) United States Patent
Biegelsen (10) Patent No.: US 7,194,170 B2
(45) Date of Patent: Mar. 20, 2007

(54) ELASTIC MICROCHANNEL COLLIMATING ARRAYS AND METHOD OF FABRICATION

(75) Inventor: David K. Biegelsen, Portola Valley, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 233 days.

(21) Appl. No.: 10/980,334

(22) Filed: Nov. 4, 2004

(65) Prior Publication Data

US 2006/0093292 A1 May 4, 2006

(51) Int. Cl.
G02B 6/06 (2006.01)
G02B 27/30 (2006.01)
G02B 6/04 (2006.01)

(52) U.S. Cl. .................. 385/116; 385/115; 385/120; 359/641

(58) Field of Classification Search ............. 385/115, 385/116, 120; 359/641
See application file for complete search history.

(56) References Cited

U.S. PATENT DOCUMENTS

| 3,543,384 A | * | 12/1970 | Hansen ........................ 82/47 |
| 4,597,096 A | * | 6/1986 | Larsson ..................... 378/149 |
| 5,966,424 A | * | 10/1999 | Liu ........................... 378/98.8 |
| 6,476,376 B1 | | 11/2002 | Biegelsen et al. ......... 250/221 |
| 2005/0286846 A1 | * | 12/2005 | Bayley et al. ............. 385/116 |

* cited by examiner

Primary Examiner—Frank G. Font
Assistant Examiner—Derek L. Dupuis
(74) Attorney, Agent, or Firm—Oliff & Berridge, PLC (57) ABSTRACT

A microchannel collimating array may be fabricated by casting an elastic sheet onto a substrate containing a plurality of pedestals. The elastic sheet may be cured, and then pulled away from the substrate, leaving the elastic sheet with a plurality of tubes at the locations of the pedestals. The plurality of tubes may collimate light incident on the elastic sheet.

13 Claims, 7 Drawing Sheets

ELASTIC MICROCHANNEL COLLIMATING ARRAYS AND METHOD OF FABRICATION

BACKGROUND OF THE INVENTION

1. Field of Invention

This invention is directed to the fabrication of structures with high aspect ratio features. In particular, this invention is directed to the fabrication of microchannel collimating structures.

2. Description of Related Art

Features which have high aspect ratios, e.g., voids which are narrow but relatively deep, or columns which are narrow but relatively high, are fabricated using various thin film manufacturing techniques. For example, vias in electronic integrated circuitry have required development of processes which are capable of repeatably controlling the feature dimensions. Vias are required to be small, for example, in order to increase the packing density of electronic structures built in a die. However, they are also required to be quite deep, as the increasing complexity of integrated circuits often requires electrical access to layers buried far below the surface.

Another structure requiring high aspect ratio features is a microchannel collimating array. A microchannel light collimating array is a sheet of material with an array of parallel tubes that transmit light through the material but absorb light traveling at angles from the axis (measured in radians) greater than the reciprocal of the aspect ratio, where the aspect ratio is given by the height divided by the diameter. Light rays traveling along or nearly along the axis of the tube are transmitted through the tube, whereas off-axis light rays are captured by the absorbing tube walls. Therefore, the light transmitted through the microchannel array tends to be collimated in a direction parallel to the tube axes.

Because the tubes only transmit light traveling nearly along the axis of the tubes, microchannel collimating arrays can be used to spatially resolve small areas on a surface, and distinguish the light coming from these small areas, from light coming from adjacent areas. Therefore, microchannel collimating arrays can improve the resolution of large area detectors by allowing light from only a small region on the surface to reach the detector. Such microchannel collimating arrays therefore allow the large area detectors to operate in the near field, without using optical lenses, to collect light from a small area of the surface.

Microchannel collimating arrays can also be used to collimate light of frequencies for which ordinary lenses are not available. For example, optical lens materials may not be sufficiently transmissive in, for example, the ultra-violet region of the spectrum.

In the ultra-violet region, microchannel collimating arrays can be used as a barrier between regions at different pressures within an apparatus, as well as a collimator. In this situation, a transmissive barrier is required to separate the different pressure regions. However, as mentioned above, transmissive materials are not available in some portions of the spectrum. Microchannel collimating arrays can provide such a barrier, because the dimensions of the transmissive tube are sufficiently small to impede the flow of gas through the tube, thereby allowing a pressure differential to be maintained across the microchannel collimating array. For example, by disposing a high vacuum turbopump on one side of the microchannel collimating array, and a mechanical roughing pump on the other side, a pressure differential of several hundreds of torr can be maintained.

SUMMARY OF THE INVENTION

However, the tubes which are sufficiently narrow to impede the flow of gas and provide the desired collimating effect are difficult to fabricate, because it is hard to create features with arbitrarily large aspect ratios. The difficulty arises because the edges of a feature tend to shadow the interior. Therefore, it is difficult to create arbitrarily deep voids without also increasing the diameter of the inlet to the void. In general, the the higher the aspect ratio desired, the more collimated the tool which must be used to remove the material to create the void. For example, reactive ion etching with its directional beam, can create holes with a higher aspect ratio than plasma etching, which is less directional. Lasers, which are sources of collimated light, are also sometimes used to create deep holes with a narrow diameter. For example, known techniques for making microchannel collimating arrays include laser machining of an inexpensive, easily machined material such as paper.

However, laser machining of paper sheets is slow, and cannot produce holes with as high an aspect ratio as would be desired for good collimation properties.

Another way of creating a void is to form one or more pedestals on a platform, deposit a material over the platform and around the pedestals, then remove the material so that voids remain in the material in the place of the pedestals. However, to use this technique, a method for separating the material from the platform must be developed to cleanly and reliably separate the deposited material from the platform without damaging the material.

Accordingly, systems and methods are provided for forming voids in a material. Systems and methods are also provided whereby a deposited material can be cleanly and reliably separated from a fabrication substrate. Further, systems and methods are provided which are capable of forming microchannel collimating arrays.

Systems and methods are disclosed which provide an optically absorbing, highly elastic material deposited on a substrate, and then removed, for example, by peeling the elastic material from the substrate, for example. Pedestals which are disposed on the substrate leave voids in the elastic material at the locations of the pedestals. In such a manner, an array of small tubes may be formed in the material at the locations of the pedestals. The elastic material may then be suitable for use as a microchannel collimating array.

The optically absorbing, elastic material may be thermally cured on the surface of the substrate including the pedestals. One or more additional optically transparent support materials may also be deposited over the elastic material. The optically transparent support material(s) may provide additional strength to facilitate handling the elastic material, especially during separation from the substrate, and, for example, during installation in an optical detector.

These and other features and advantages are described in, or are apparent from, the following detailed description.

BRIEF DESCRIPTION OF THE DRAWINGS

Various details are described below, with reference to the following figures, wherein.

DETAILED DESCRIPTION

Systems and methods are disclosed which provide a microchannel collimating array by forming an elastic material with respect to a substrate, and then removing the elastic material from the substrate. The substrate may be formed with a plurality of pedestals, for example, which leave voids in the elastic material when the elastic material is removed. Therefore, the elastic material may be left with a plurality of voids in the form of tubes. Such tubes may be used to collimate light, and may therefore be used as a microchannel collimating array.

Figure 1:
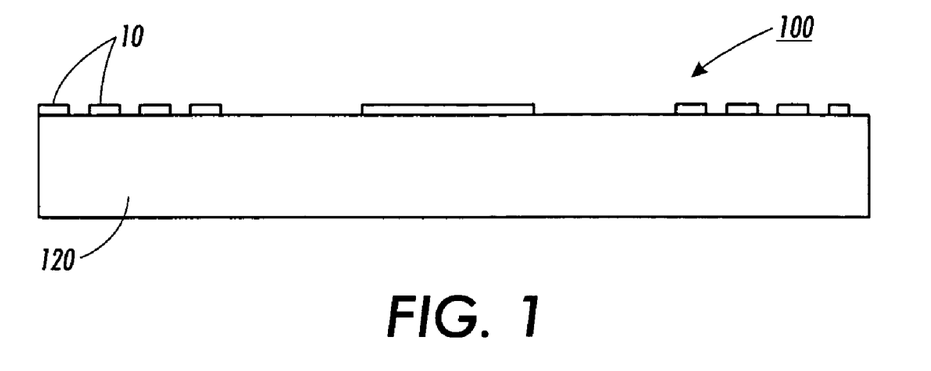
FIG. 1 is a diagram of an exemplary substrate with a patterned photoresist.

FIG. 1 shows an exemplary substrate 100 covered with photoresist 10. Photoresist 10 has been patterned, for example, by exposing the photoresist 10 to light through a mask. Exposed portions of photoresist 10 are developed and dissolved with a solvent, leaving only some portions of the surface of substrate material 120 covered with photoresist 10. The substrate material 120 may be, for example, silicon, metal, or other suitably rigid, strong and tough processable material.

Substrate 100 may be subjected to a procedure to remove portions of substrate material 120 from areas which are not covered with photoresist 10. The procedure may be, for example, reactive ion etching (RIE), which uses an ionizable gas with an electrode (not shown) placed above the substrate, and the substrate acting as the other electrode. Ionized species of the gas are accelerated in response to an electric field generated between the electrode and the substrate, so that the species are incident on the substrate with approximately normal incidence.

Material is thus removed from areas not covered with photoresist by bombarding the surface with the ionized species.

Figure 2:
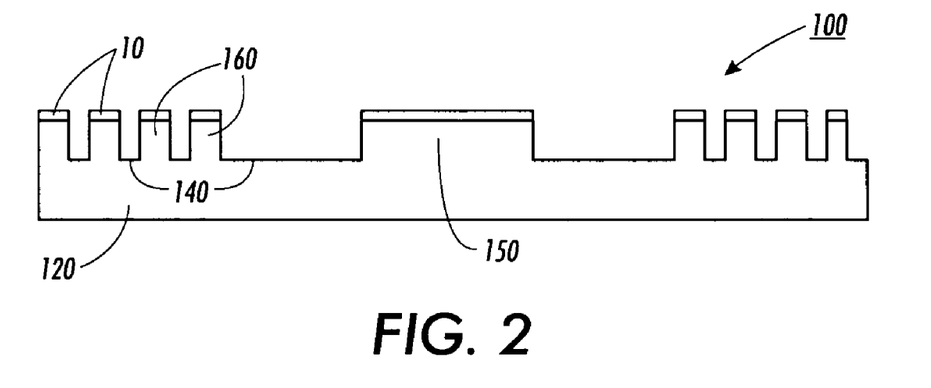
FIG. 2 is a diagram of the exemplary substrate etched according to the photoresist.

FIG. 2 shows the exemplary substrate 100 from which substrate material 120 has been removed from areas, for example, by a reactive ion etching process as described above. The removal of material leaves voids 140 and pedestals 160 in the substrate 100. Pedestals 160 may have a height of approximately 500 microns with respect to the remaining substrate surface, and a diameter of approximately 50–100 microns and a taper angle of less than about 0.1 radians, yielding an aspect ratio range of about 10:1 to 5:1, respectively. It should be appreciated that the voids and pedestals are depicted in the associated figures as having a smaller aspect ratio. However, this is for ease of depiction, and it should be understood that in reality, the voids and pedestals may have much larger aspect ratios, such as 5:1 or 10:1, or even larger. Pedestals 160 may be separated by a distance comparable to the diameter of the pedestals 160. These areas correspond to the voids 140. For example, the pedestals may be 100 microns wide and 150 microns apart center to center. Pedestals 160 may be arranged in a close-packed hexagonal array, for example, in order to maximize the number of pedestals per unit surface area on substrate 100. Substrate 100 may also include a wider pedestal 150, for example, to accommodate necessary interfering structures such as a surface-mounted light emitting diode, as described below.

After voids 140 and pedestals 160 are formed on substrate 100, the remaining photoresist 10 may be removed, for example, by applying a suitable solvent. The solvent dissolves photoresist 10 which is washed away to leave substrate 20 clean.

Figure 3:
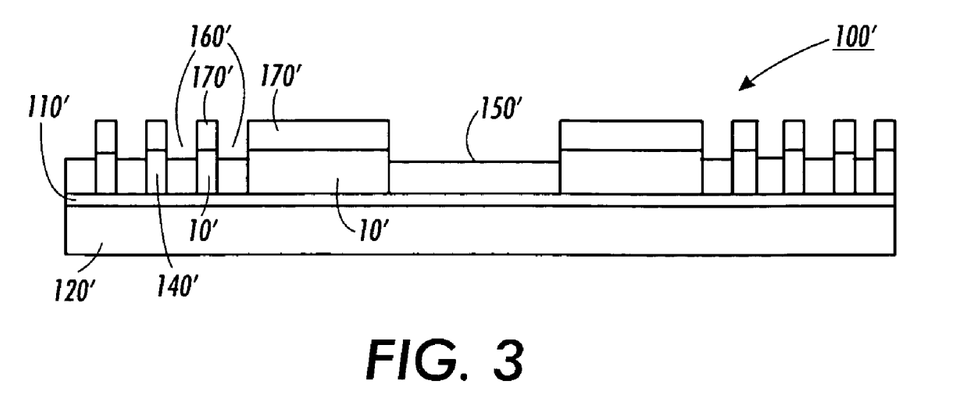
FIG. 3 is a diagram of an exemplary substrate with plated material over patterned photoresist.
Figure 4:
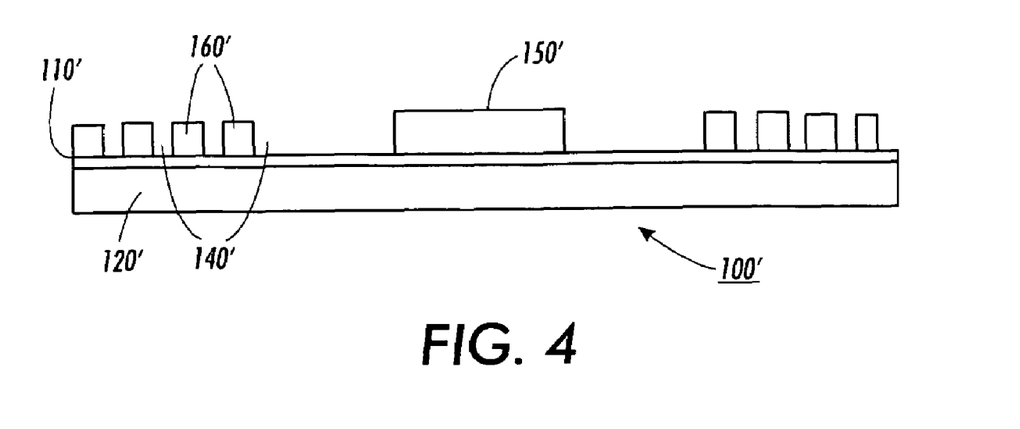
FIG. 4 is a diagram of the plated substrate with the photoresist removed.

FIG. 3 shows an alternative approach for making the substrate with voids and pedestals, using a plating process. The approach begins by depositing a seed layer 110' on the substrate 120'. The seed layer 110' is then covered with a photoresist 10'. The photoresist 10' is patterned and removed in areas which will correspond to pedestals 160', but remains over areas that will correspond to voids 140'. Material is then electroplated over areas 160' having no photoresist, for example, by applying a bias potential to the seed layer 110' relative to the potential of the plating bath. After plating, the photoresist 10' is removed, as shown in FIG. 4. This leaves voids 140' adjacent to a set of pedestals 160' of the plated material.

As another alternative to the photoresist methods described above, voids and pedestals may be made directly on SU8, an epoxy photopolymer substrate material manufactured by IBM of Armonk, N.Y., which polymerizes upon exposure to light. By masking off certain portions of the SU8 surface, the exposed portions may be irradiated by a collimated ultra-violet source, which polymerizes the material, so that the unirradiated areas can be dissolved and removed, to form voids and pedestals.

In addition, an intermediate mold and master mold pair may be used. In this approach, an intermediate mold is formed from a master mold, wherein the voids on the intermediate mold are formed by the pedestals on the master mold, and the pedestals in the intermediate mold are formed by the voids on the master mold. The intermediate mold therefore inverts the geometry of the master mold. The intermediate mold may then be used as the substrate 100 for forming the microchannel collimating array, as described further below.

Any other method of creating the voids and pedestals, which can create the features with smooth, parallel (i.e., negligibly tapered) walls can be used. It is expected that any process capable of creating features whose walls are vertical and parallel to better than about 0.1 radians is acceptable.

Figure 5:
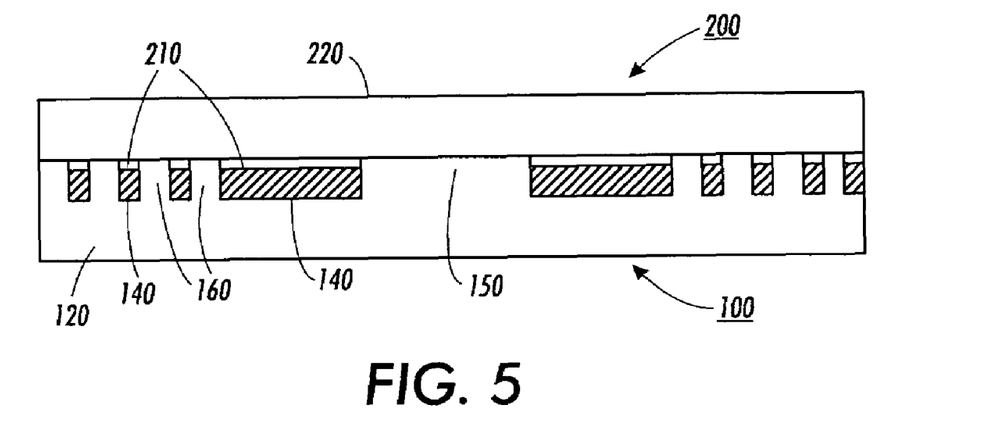
FIG. 5 illustrates an exemplary method for forming an array of holes in an elastic material, by covering a substrate with the elastic material and a support material.

FIG. 5 illustrates the next steps of the processing according to this exemplary method. An optional thin release layer (not shown), one to several monolayers thick, may first be applied to the clean substrate 120, which will assist the separation of the elastic sheet from the substrate, as described below. Clean substrate 120 may then be coated with a relatively non-viscous, polymerizable fluid material 210. Fluid material 210 may be any fluid which when cured, becomes a rubbery polymer, such as a urethane or silicone, for example, polydimethylsiloxane (PDMS). Curing can be stimulated by UV irradiation and/or heating, or by various other means, to cross link the chemical constituents of the polymeric material. Cured polydimethylsiloxane can stretch by 100 to 1000% and return to its original shape when released with negligible permanent deformation. Such polymers are also approximately incompressible, that is, they conserve volume. When pulled in one direction, the elongation in that direction causes a shrinkage in the lateral direction. Therefore, when the polymer material is removed from a narrow, deep void, the stretching from one end causes the material to contract in the perpendicular direction, thereby pulling away from the walls of the void. The point of release propagates down the depth of the void until the elastic material is totally released. For a matrix of such voids formed in a substrate, stretching of the elastic material in the longitudinal direction (parallel to the axis of the void) causes the material to contract in the lateral direction, allowing easy separation from the substrate.

The fluid precursor to cured elastic material 210 may fill in voids 140 formed in the substrate 120, for example, to a level just shy of the height of the pedestals 160, as shown in FIG. 5. Cured elastic material 210 may be chosen to have suitable elastic and optical properties. In particular, cured elastic sheet 210 may be optically opaque, either by filling the polymer with absorbing micro- or nano-particles, or using chemical constituents which themselves absorb at the wavelength band of interest. Elastic sheet 210 may be, for example, a silicone, which may be applied by casting liquid silicone material over substrate 120 and allowing the silicone to planarize into a thin layer. Silicone fluids have low viscosity which enables the filling of the high aspect ratio voids 140. Elastic sheet 210 may be drawn into voids 140 between pedestals 160, for example, by capillary action.

The silicone may then be cured in order to solidify elastic sheet 210. Silicones such as polydimethylsiloxane, for example, Dow Corning Sylgard Elastomer 184, may be cured by an organometallic cross linking reaction. Curing involves an agent that catalyzes the addition of an SiH bond across the vinyl groups of the base compound, forming Si—CH$_2$—CH$_2$—Si chains. Multiple reaction sites allow three-dimensional cross linking of the base compound, and no waste or volatile reaction products, such as water, are generated. The hardness of the cured silicone may be adjusted by adjusting the ratio of the curing agent to the base silicone material. If the amount of curing agent is increased, a harder, more cross linked silicone compound results. Heating the silicone and curing agent in an oven, for example, at 80 degrees Celsius, will accelerate the cross linking reaction. Alternatively, elastic sheet 210 may be an ultra-violet curable material, which may be cured by exposure to an ultra-violet lamp. In this case, the elastic sheet 210 may include additives which act as photoinitiators. Elastic sheet 210 may also be a thermoplastic or thermosetting compound, or a compound which is chemically polymerized, for example, at room temperature.

Substrate 120 and cast elastic sheet 210 may then also be coated with a support material 220, which may be used to provide additional structural strength. This additional rigidity eases handling requirements by improving the strength and toughness of the elastic sheet 210 upon release from substrate 120. Support material 220 may be optically transparent. For example, support material 220 may also be silicone, however, lacking the additives that make elastic sheet 210 opaque. If support material 220 is silicone, it may also be cast by applying liquid silicone to the surface of elastic sheet 210, and allowing silicone support material 220 to planarize into a thin film. Support material 220 may then be cured, for example, by baking in an oven at 80 degrees Celsius, or exposing the material to ultra-violet light. Silicone support material 220 may be cured at the same time as the elastic sheet 210, or may be cured separately. For example, elastic sheet 210 may be partially cured before application of support material 220, in order to keep the two liquids from mixing.

Elastic sheet 210 and support material 220 may then be released from substrate 120 after curing by, for example, simply pulling elastic sheet 210 and support material 220 from substrate 120. The action of pulling tends to detach adhering walls of elastic sheet 210 from pedestals 160 of substrate 120. Elastic sheet 210 and support material 220 may also be detached from substrate 120 by peeling or stretching elastic sheet 210 and support material 220 away from substrate 120.

The separation of elastic sheet 210 from the substrate 120 may be assisted by the application of a thin film of a release agent (not shown), such as a thin layer of hydrophilic material between elastic sheet 210 and substrate 120. The release agent may be, for example, water. The release agent may be used to diminish adhesion between elastic sheet 210 and substrate 120.

Figure 6:
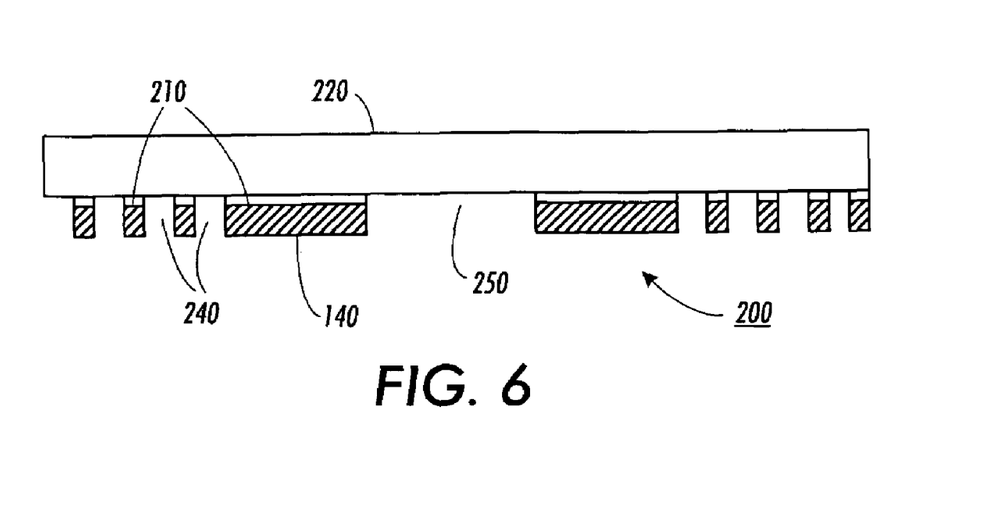
FIG. 6 is a diagram of the elastic material and the support material after release from the substrate.

FIG. 6 shows an exemplary microchannel collimating array 200 comprising elastic sheet 210 and supporting material 220, as removed from substrate 120. After removal from substrate 120, tube-like voids 240 are left in the elastic sheet 210 at the positions corresponding to pedestals 160. Cast and cured silicone will replicate a master mold precisely. Thus, tube-like voids 240 may be formed to have smooth walled surfaces, such that each reflects light effectively when the light is nearly along the axis thereof, or microscopically rough to maximize the capture and absorption of light which hits the walls. The verticality and parallelism of the walls of tube-like voids 240 can be better than about 0.1 radians. Therefore, elastic sheet 210 may form microchannel collimating array 200, having an array of tube-like voids 240 that is capable of collimating light directed onto elastic sheet 210.

As noted above, elastic sheet 210 may also have larger features, such as void 250 formed by the presence of wider pedestal 150. Larger void 250 may be used to encapsulate a surface-mounted light emitting diode (not shown). The diode may be positioned so as to emit light into a relatively large solid angle (for example, into a 160 degree cone) which is diffusely reflected from a sample surface. The light scattered by the sample surface may then be collimated by microchannel collimating array 200 and directed by microchannel collimating array 200 back onto a detector placed behind microchannel collimating array 200. The presence of support material 220 may also be beneficial to such an implementation, for example, by providing an index-matched material in conformal contact with the clear encapsulating material of the light emitting diode, enabling greater and more uniform output from the light emitting diode.

Figure 7:
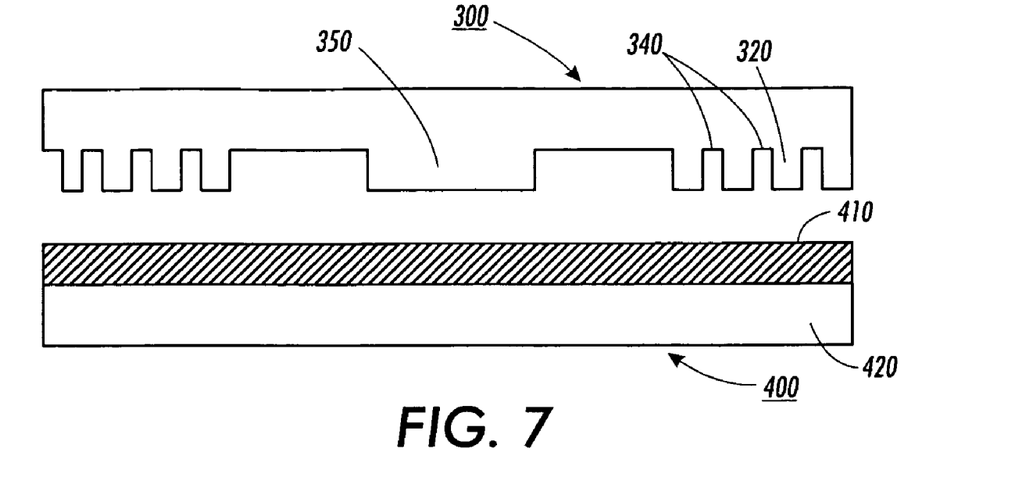
FIG. 7 illustrates another exemplary method for forming an array of holes in an elastic material, using a patterned substrate, an elastic material and a support material.
Figure 8:
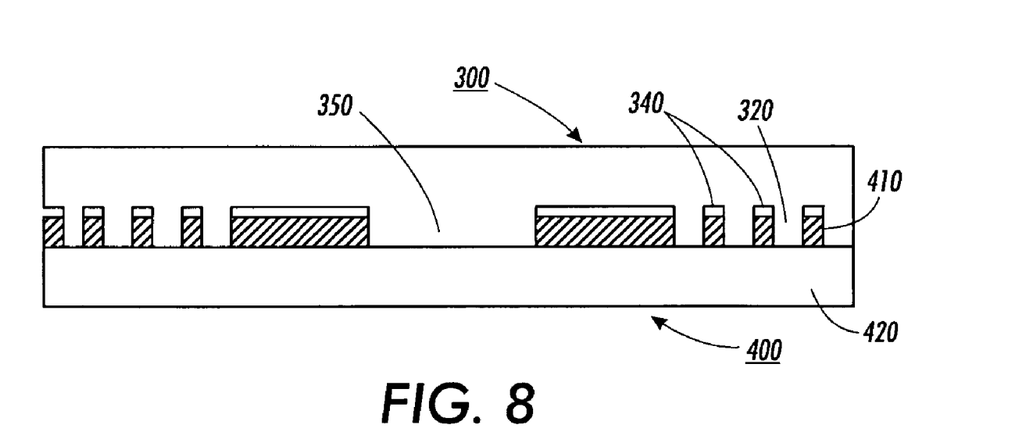
FIG. 8 is a diagram of the elastic material and the support material being pressed by the patterned substrate.

FIG. 7 illustrates another exemplary method for forming an array of holes in an elastic sheet. In the exemplary method, patterned substrate 300 is used to push holes into a uniform monolithic sheet of uncured precursor material 410 formed over support material 420. Support material 420 may be partially or fully cured, whereas elastic sheet 410 may be only partially, or not at all cured. Although layer 410 may be viscous, elastic sheet 410 is still in essentially a liquid state, and therefore will flow around the penetrating pedestals 320 of patterned substrate 300. The thickness of layer 410 is chosen such that, depending on the pattern of the embossing substrate, the liquid can flow laterally away from regions of the posts and rise up into the neighboring regions of the voids. Excess material can also be extruded from the sides of the embossing plate. Patterned substrate 300 is brought toward support material 420 until, for example, sufficient resistance to further movement is encountered, that it can be inferred that contact with support material 420 has been made, as shown in FIG. 8.

Figure 9:
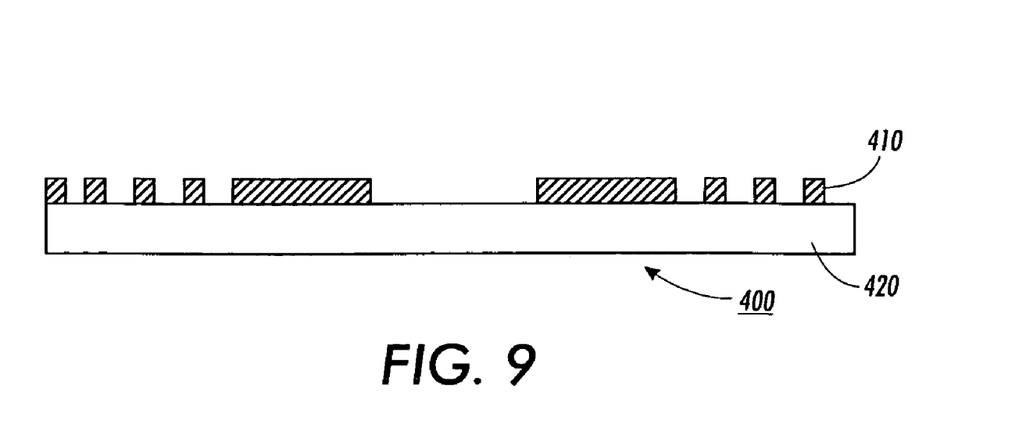
FIG. 9 is a diagram of the elastic material and the support material after removal of the patterned substrate.

At this point, the movement of patterned substrate 300 is stopped, and elastic sheet 410 and support material 420 (if not already fully cured) are then cured. As mentioned above, this curing may be accomplished by baking the assembly 300 and 400 in an oven at 80 degrees Celsius, for example, or by UV irradiation, or both. Patterned microchannel collimating array 400 is then removed from patterned substrate 300, for example, by grasping the support material 420 and pulling the microchannel collimating array 400 from patterned substrate 300. Upon release from patterned substrate 300, microchannel collimating array 400 may be ready for use. The condition of microchannel collimating array 400 upon release is shown in FIG. 9.

Figure 10:
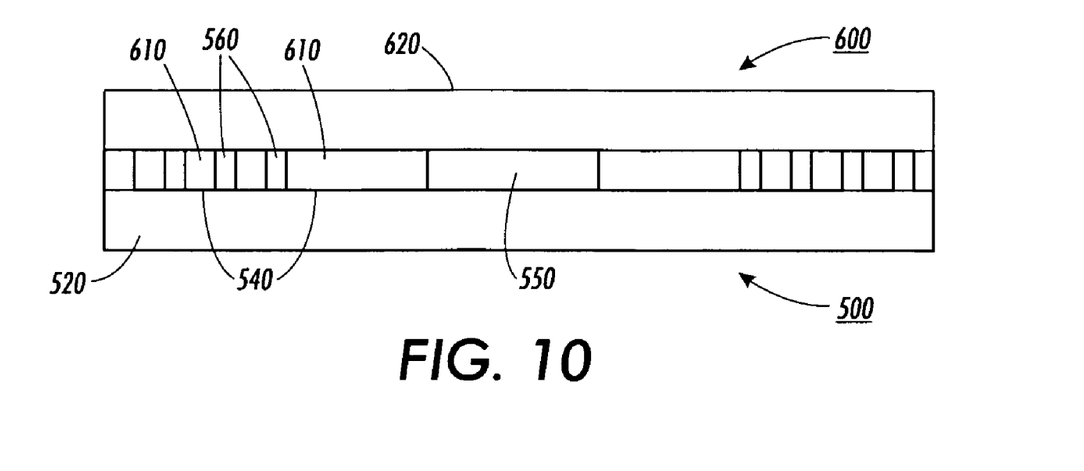
FIG. 10 illustrates another exemplary method for forming an array of holes in an elastic material, using a patterned substrate.

FIG. 10 shows another exemplary method for forming a microchannel collimating array using a patterned substrate and an elastic sheet. In this exemplary method, the voids 540 of patterned substrate 500 are filled with a transparent, rather than opaque, elastic material 610. Support material 620 may also be transparent, and is formed over elastic material 610. Elastic material 610 may be the same material as support material 620. Elastic material 610 and support material 620 are then cured. Elastic material 610 and support material 620 are then removed from patterned substrate 500, for example, by pulling the elastic material away from the pedestals 560 of substrate 500.

Making elastic material 610 the same material as support material 620 may simplify the release process, since, for example, a single release agent may be used which is optimized for the single-material interface between patterned substrate 500 and elastic material 610 or support material 620.

Figure 11:
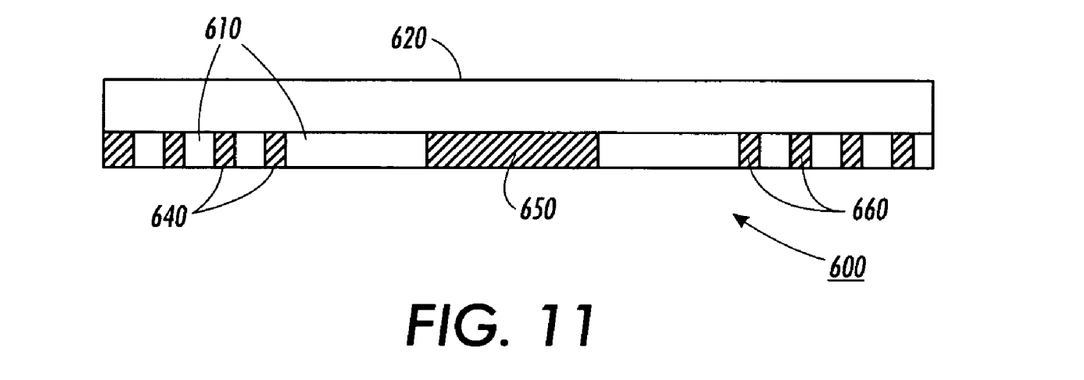
FIG. 11 is a diagram of the elastic material after release from the substrate, and filling the holes with an opaque material.

After curing the elastic material 610 and support material 620, they are removed from patterned substrate 500. The microchannel collimating array 600 may then be completed by filling the voids in the elastic material with an opaque material 640, as shown in FIG. 11. Opaque material 640 is preferably also elastic, but is not required to be so. Upon inspection of the foregoing process, it is evident that this process uses the substrate as an inverse mold, as compared to the first exemplary process, in that the pedestals 560 of the substrate 500 will form the areas 640 that surround the transmissive holes in the completed microchannel collimating array 600, rather than the holes themselves. Therefore, the photolithographic mask used to pattern substrate 500 should be re-designed, so that the voids 540 in the substrate 520 are circular, and the pedestals 560 in the substrate 520 are the matrix surrounding the circular voids 540.

Figure 12:
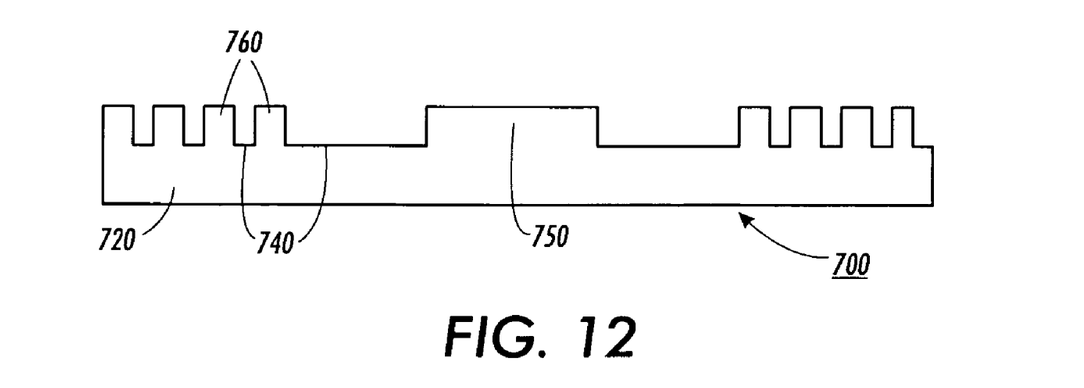
FIG. 12 is a diagram of an exemplary structure for a dissolvable patterned substrate.
Figure 13:
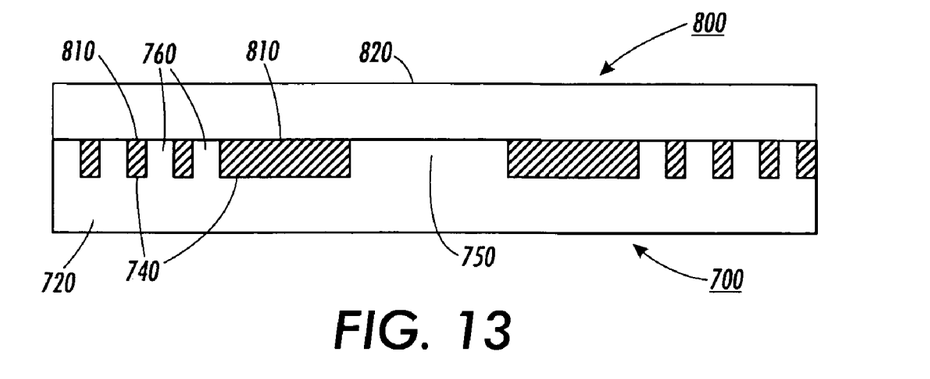
FIG. 13 illustrates another exemplary method for forming an array of holes in an elastic material, using the dissolvable patterned substrate.
Figure 14:
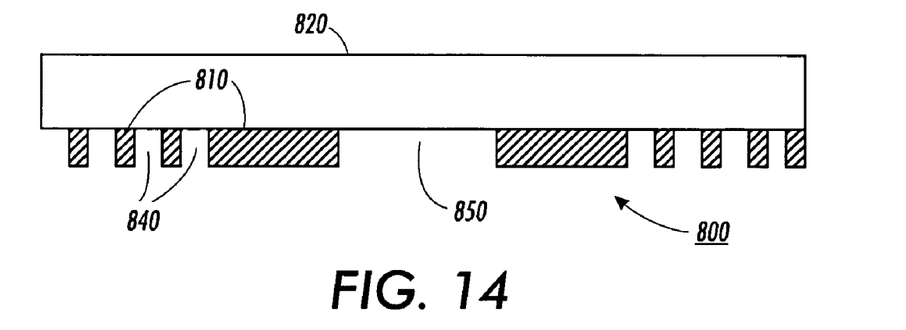
FIG. 14 is a diagram of the elastic material after the patterned substrate is dissolved.

FIG. 12 illustrates another exemplary method for forming an array of holes in an elastic material. In FIG. 12, pedestals 760 are formed on a substrate 700 using a soluble material, for example, a water-soluble starch, such as potato starch. Pedestals 760 may be formed, for example, by extrusion through an array of holes in a die. In various exemplary implementations, substrate 700 may also be made of the soluble material. As shown in FIG. 13, after solidification of the soluble material 760, an opaque elastic polymer material 810 is deposited between pedestals 760, which fills spaces 740 between soluble pedestals 760, for example, by capillary action. Opaque elastic material 810 may then be covered with a transparent support material 820, and the assembly 700 and 800 may then be cured. After curing, the soluble pedestals 760 may be removed by dissolving the material in an appropriate solvent, for example, in water. The microchannel collimating array 800 is then free of the soluble material and the substrate 700, and is ready to use, as shown in FIG. 14.

Figure 15:
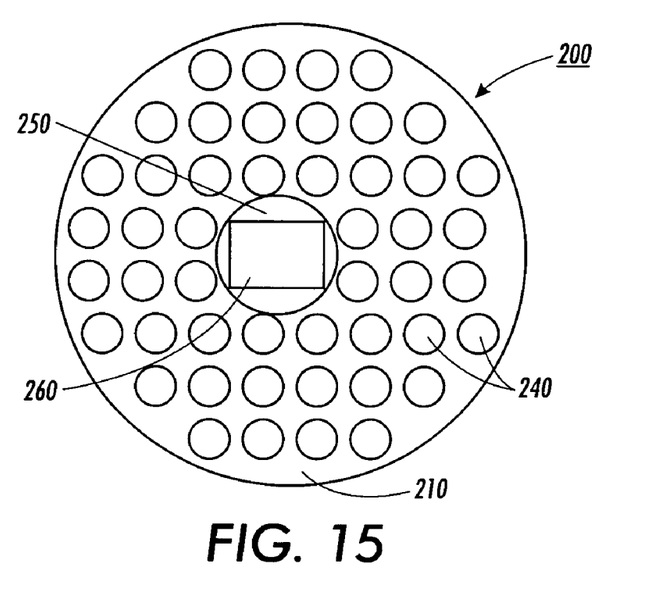
FIG. 15 is a plan view of a portion of an exemplary microchannel collimating array.

FIG. 15 shows an exemplary plan view of a portion of microchannel collimating array 200, formed by any of the preceding methods. Elastic sheet 210 is perforated with a large number of tube-like voids 240, corresponding to the locations of pedestals 160 on substrate 120. The dimensions of the tube-like voids 240 may be, for example, at least about 10 microns in diameter on 15 micron centers. More preferably, the dimensions may be about 100 microns in diameter on approximately 150 micron centers. Generally, the ratio of the open space, defined as the sum of the areas of the apertures of the tube-like voids 240, to the total surface area of elastic sheet 210 may be at least 50%. Therefore, the loss of light that is propagating within the desired acceptance angle is ~50%. It should also be noted that because the tube diameter is selected to be at least 10 times the wavelength of the light to be transmitted, diffraction of the light exiting the tube will spread the light less than the angle determined geometrically by the aspect ratio of the tube. Accordingly, the light which is transmitted by each tube-like void 240 exits each tube-like void 240 with a trajectory close to the axis of each tube-like void 240, and is therefore collimated. Elastic sheet 210 may be at least about 100 microns thick. For example, elastic sheet 210 may be preferably about 500 microns thick. Therefore, the aspect ratio of the tubes is about 5:1. FIG. 15 also shows a larger diameter hole 250 for accommodating a light emitting diode 260.

Figure 16:
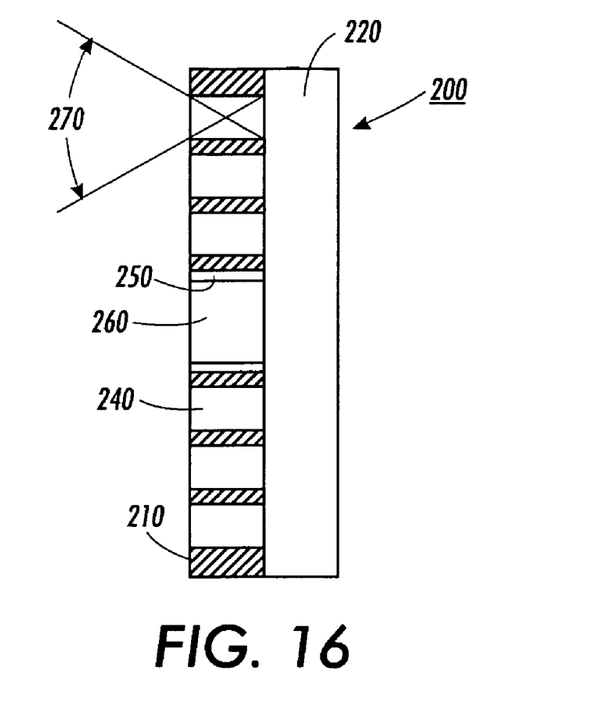
FIG. 16 is a side view of a portion of the microchannel collimating array of FIG. 15.

Support material 220 is shown in side view in FIG. 16. As mentioned above, support material 220 may be silicone and may be at least about 100 microns thick. For example, support material 220 may be preferably about 1 mm thick. Support material 220 is transparent to light transmitted by tube-like voids 140 of microchannel collimating array 200. Therefore, support material 220 does not interfere with the transmission of light, but only provides strength, for example, for handling and installation. Tubes through opaque layer 210 can also optionally be filled with a transparent material, for example, to keep dust from accumulating within the voids. Filling can be achieved by evacuation and backfilling with a transparent curable material or a settable material or even a non-setting liquid.

The aspect ratio of each tube-like void 240 defines a cone of acceptance 270 of each tube-like void 240, as illustrated in FIG. 16. Cone of acceptance 270 is the cone within which light will be transmitted by tube-like void 240. For the implementation described above, with an aspect ratio of about 5:1, cone of acceptance 270 is about arctan(0.2)~22 degrees. Since the verticality and parallelism of silicone tube-like voids 240 are expected to be better than about 0.1 radians or 6 degrees, whereas cone of acceptance 270 is greater than about 20 degrees, the variability of the parallelism and verticality of the tube walls is small compared to cone of acceptance 270.

Figure 17:
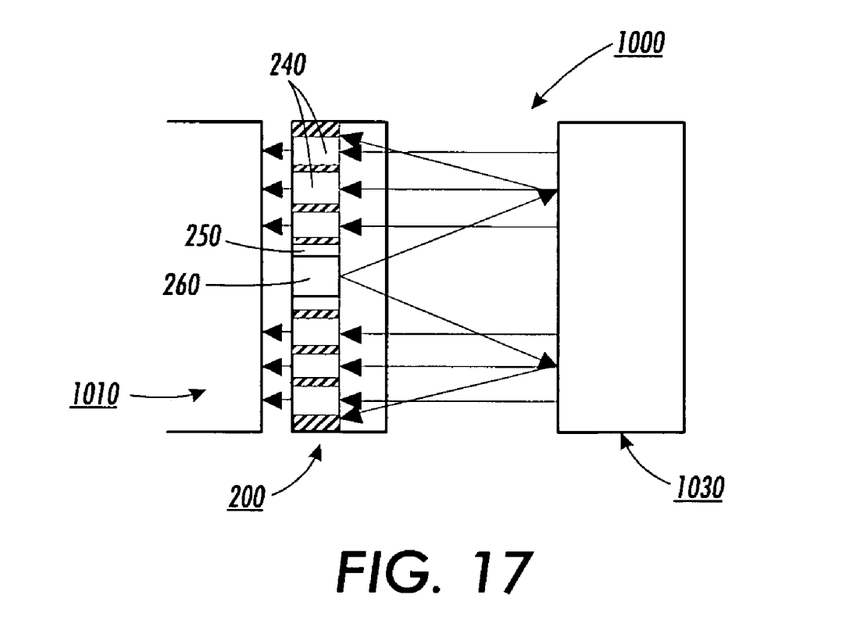
FIG. 17 illustrates an exemplary system using the microchannel collimating array of FIG. 15.

FIG. 17 shows microchannel collimating array 200 disposed within a larger system 1000. System 1000 may include a source of light such as a light emitting diode 260, which may be located within microchannel collimating array 200. Light from light emitting diode 260 may be output in a relatively large angle, for example, 130 degrees full width, half maximum (FWHM). Light from light emitting diode 260 may be incident on a sample surface 1030 that scatters the light back in all directions, with some rays entering into microchannel collimating array 200. Microchannel collimating array 200 has a plurality of parallel tube-like voids 240 formed by, for example, the methods described above. The smooth walls of tube-like voids 240 transmit light which is traveling on or near the axis of the tube, as shown in FIG. 17. Collimated light transmitted by voids 140 may then be incident on a detector 1010, which may measure, for example, the signal intensity of the light, as a function of spatial location over sample surface 1030. The detector 1010 may be located directly adjacent to, and in contact with, the microchannel collimating array, or a short distance away, as shown in FIG. 17.

Because of the effect of microchannel collimating array 200, only light emanating from within the cone of acceptance of each tube-like void 240 is delivered to detector 1010. Therefore, by placing microchannel collimating array 200 a given distance from sample surface 1030, only light generated by an area within cone of acceptance 270 of each tube-like void 240 will be transmitted to the area of the detector located directly adjacent to tube-like void 240. Detector 1010 may be a CCD array, for example, capable of imaging light intensity as a function of pixel position on the array or a large area sensor or sensor array as described in U.S. Pat. No. 6,476,376, which is incorporated by reference herein in its entirety. Therefore, by using microchannel collimating array 200, a small area of sample surface 1030 may be imaged onto a single pixel of the detector, with little interference from adjacent areas on sample surface 1030. Therefore, relatively large pixels can be used in the detector array, without degrading the resolution of the image. In other implementations, detector 1010 may be a single photodiode, for example, outputting a single signal proportional to the integrated light intensity over the detection surface of the photodiode. The embodiments above have described applications in a reflecting mode of operation, that is, the illumination and detection occur on the same side of the detected object. In an alternative, transmission embodiment, the collimating array can be placed near a broad area illumination source on the side of the object opposite to that of the detector. Then the object eclipses light from the illumination source from getting to the detector. The light from the illumination source is collimated by the collimation array, so that the umbral width (the distance over which the shadow edge goes from full illumination to full darkness) is as small as possible, thus facilitating a precise determination of the location of the edge of the object.

Another application of microchannel collimating array 200 is as a privacy screen for viewing a display, for example on a laptop computer or television. Because of the finite cone of acceptance 270 of each of tube-like voids 240 in microchannel collimating array 200, rays from the computer screen transmitted through tube-like voids 240 will not be visible to viewers standing outside of cone of acceptance 270. Therefore, by attaching microchannel collimating array 200 to a computer screen, a user can be assured that no one viewing the screen from outside a certain viewing angle, for example, over the user's shoulder, will be able to see the information displayed on the screen.

The microchannel collimating array can also have its tubes tilted at an arbitrary angle from the normal axis of the elastic sheet, such that the cone of acceptance of each tube is shifted at an angle from the normal axis of the sheet. Since it is relatively easy to create pedestals tilted at an arbitrary angle from vertical, for example, by tilting the collimated UV light in cross-linking SU8 molds, fabricating a microchannel collimating array with tilted tubes is straightforward. Such a device may be useful, for example, in the privacy screen described above, when it is desirable for the comfort of the user, to adjust the viewing angle to the screen. This may be accomplished, for example, by rotating the axis of the microchannel collimating array, which will rotate the tilt angle of the parallel tubes in the microchannel collimating array.

In addition, portions of the microchannel collimating array may have their tubes oriented at a different angle compared to other portions of microchannel collimating array. For example, in the privacy screen described above, the cone of acceptance of each of the tubes in a radial segment of the microchannel collimating array may be rotated so as to direct light toward a viewer located at a particular position in front of the display. Therefore, only a viewer located at this position will be able to see light from the entire screen.

Figure 18:
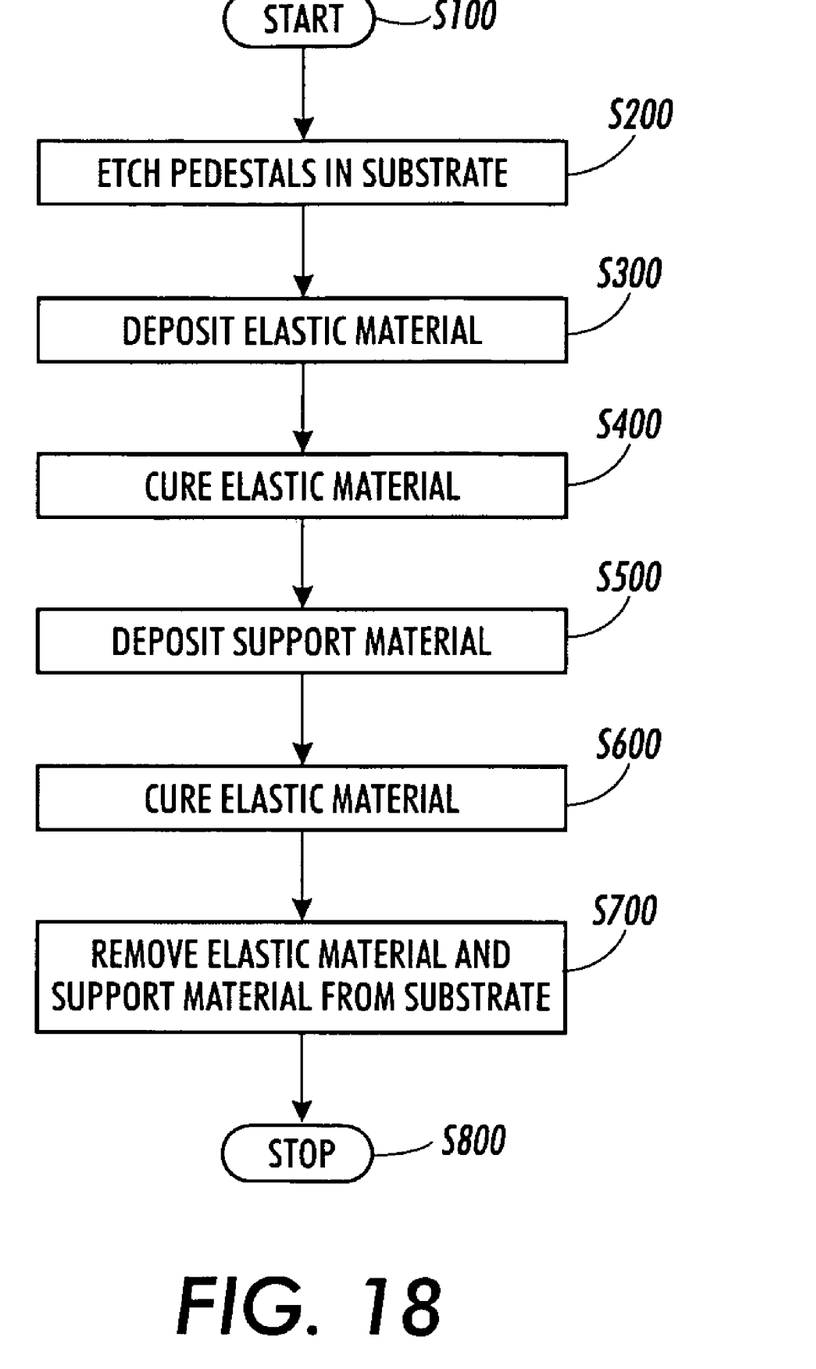
FIG. 18 is a flowchart illustrating an exemplary process for fabricating the microchannel collimating array.

FIG. 18 is a flowchart illustrating an exemplary method for fabricating microchannel collimating array. The method begins in step S100 and proceeds to step S200. In step S200, pedestals are fabricated in or on a substrate. In step S300, the elastic material is deposited on the etched substrate. In step S400, the elastic material is cured. In step S500, the support material is deposited on the elastic material. The support material may be cured in step S600. In step S700, the elastic material and the support material are removed from the substrate. The method ends in step S800. The flowchart shown in FIG. 18 is intended to be illustrative only, and numerous alternatives to the process steps shown in FIG. 18 are envisioned. For example, the support material may be cured simultaneously with the elastic material, rather than subsequently, embossing may be used instead of casting, intermediate molds may be utilized, etc.

While this invention has been described in conjunction with the exemplary details outlined above, various alternatives, modifications, variations, improvements, and/or substantial equivalents, whether known or that are or may be presently unforeseen, may become apparent upon reviewing the foregoing disclosure. For example, the techniques described herein may be used to produce other devices having voids with large aspect ratios, such as filters for filtering particles of a predefined size from particles of smaller size. Any one of a number of elastic materials may be used to fabricate the devices, and any number of rigid materials may be used as the substrate material, or as the support material. Accordingly, the exemplary details set forth above are intended to be illustrative, not limiting.

What is claimed is:

1. A microchannel collimating array, comprising:
an opaque elastic sheet having a plurality of transparent tubes extending through the sheet, with the tubes aligned such that axes of the tubes are substantially parallel over at least a portion of the opaque elastic sheet, such that light incident on the opaque elastic sheet is collimated by the tubes, the elastic sheet capable of stretching by 100% to 1000% and returning to original shape when released with substantially negligible permanent deformation.

2. The microchannel collimating array of claim 1, further comprising:
a support material formed over the elastic sheet.

3. The microchannel collimating array of claim 2, wherein the elastic material is optically opaque, and the support material is optically transparent.

4. The microchannel collimating array of claim 2, wherein the support material is at least about 100 microns thick.

5. The microchannel collimating array of claim 2, wherein at least one of the elastic sheet and the support material comprises silicone.

6. The microchannel collimating array of claim 5, wherein the elastic sheet is made of silicone so that the tubes are separated from each other by walls made of silicone.

7. The microchannel collimating array of claim 1, wherein the tubes are tilted with respect to an axis normal to a surface of the sheet.

8. The microchannel collimating array of claim 7, wherein the tubes are tilted with a distribution of angles with respect to an axis normal to a surface of the sheet.

9. The microchannel collimating array of claim 1, wherein the elastic sheet is at least about 100 microns thick, and a diameter of each of the tubes is at least about 10 microns.

10. The microchannel collimating array of claim 9, wherein the elastic sheet has a thickness between about 100 microns and about 500 microns.

11. The microchannel collimating array of claim 1, wherein the plurality of tubes is arranged in a close-packed hexagonal array, and a ratio of total open area of the tubes relative to a total area of the microchannel collimating array is at least about 25%.

12. The microchannel collimating array of claim 1, further comprising a display disposed adjacent the elastic sheet.

13. The microchannel collimating array of claim 1, wherein the elastic sheet is made of cured polydimethylsiloxane, so that the tubes are separated from each other by walls made of polydimethylsiloxane.

* * * * *